United States Patent [19]

Renner et al.

[11] 3,965,340

[45] June 22, 1976

[54] OPTICAL COUNTING DEVICE

[76] Inventors: Mathias Renner, 9950 Durant Drive, Beverly Hills, Calif. 90212; Ronald L. Lyons, 722 Danvers Circle, Newbury Park, Calif. 91320

[22] Filed: Dec. 26, 1974

[21] Appl. No.: 536,544

[52] U.S. Cl. .................... 235/151.32; 234/92 DM; 340/172.5
[51] Int. Cl.² ...................... G06F 3/05; G01C 5/00
[58] Field of Search .......... 235/151.32, 92 D, 92 M, 235/92 MT, 92 GD, 151.3; 340/172.5; 33/143 L, 147 N, 172 E, DIG. 3; 356/169, 170

[56] References Cited
UNITED STATES PATENTS

| | | | |
|---|---|---|---|
| 3,253,153 | 5/1966 | Stoddard | 356/169 |
| 3,600,588 | 8/1971 | Sayce | 356/169 X |
| 3,601,585 | 8/1971 | Paulsen | 235/92 DN |
| 3,654,449 | 4/1972 | Boyce | 235/92 R X |
| 3,675,213 | 7/1972 | Spangler | 340/172.5 |
| 3,777,126 | 12/1973 | Hoff | 235/151.3 |
| 3,833,303 | 9/1974 | Burns et al. | 356/169 |
| 3,855,461 | 12/1974 | Stockwell | 340/172.5 X |

Primary Examiner—Edward J. Wise
Attorney, Agent, or Firm—Jack C. Munro

[57] ABSTRACT

The apparatus of this invention relates to an optical counting apparatus which is to be employed in combination with an electronic handheld calculator. The structure of this invention greatly expands the use of the handheld calculator by permitting such to be employed as a measuring device and a unit counter. An optical device is activated by the difference between transmission of light and darkness. This activation is used as a counting apparatus or a measurer of distances with the accumulated count or the distance measure to be read on the dislay unit of the calculator.

4 Claims, 6 Drawing Figures

SINUSOIDAL COUNT SIGNAL

DIGITAL COUNT SIGNAL

OPTICAL COUNTING DEVICE

BACKGROUND OF THE INVENTION

Until very recently, the electronic computer has been an instrument of substantial size and substantial expense. However, there have been substantial technological advances relating to the miniaturization of electrical circuits. Due to this, computer units can be employed in the form of a calculator which weigh only a few ounces and can be easily held in a person's hand. Such computer units employ a digital read-out system which instantaneously displays the calculated value. Such calculators can perform numerous mathematical functions such as addition, subtraction, multiplication, division, percentages, plus other functions. Such handheld calculators employ a pushbutton control panel through which the input into the calculator is to be supplied. The calculations of such a calculator are extremely accurate and most such calculators will make calculations to the eighth decimal place. Some other calculators also include a memory unit wherein certain such figures may be stored for future use, if desired.

A further advantage of such calculators is that they are now readily available to the general public at an inexpensive price. The scope of use of this electronic handheld calculator is not fully exploited at the present time.

This invention relates to the expanding of this instrument beyond the general use as a calculator to become a distance measurer or a unit counter by incorporating such with an optical reading device. Previously, it has not been known to employ the use of a handheld calculator as a distance measurer or unit counter.

SUMMARY OF THE INVENTION

The structure of this invention is designed in particular in conjunction with a distance measuring instrument, such as a height gauge instrument which employs the use of a fixed caliper member and a movable caliper member. The use of such caliper members is well known as being physically able to attain reasonably accurate distance measurements of physical objects down to a hundred or possibly even a thousandth of an inch. By incorporating of the same instrument in conjunction with an optical device and displaying such calculated values with a high degree of accuracy given by an electronic calculator, the accuracy of the same instrument can be increased to ten thousandths of an inch or higher.

Basically, the structure of this invention employs a fixed interference grating on the fixed caliper member of the height measurement device. A movable interference grating is located directly adjacent the fixed interference grating and is mounted on the movable caliper. The gratings are formed of a film material and are composed of an alternate pattern of transparent and opaque lines. The thickness of each line could be very precise such as ten thousandths of an inch in thickness. A light source is provded in conjunction with the movable caliper and is to supply light to the movable grating with the light rays to pass through the transparent areas. Since the movable grating is located directly adjacent to the fixed grating, it can be seen that the light rays being transmitted through the transparent areas of the movable grating will be alternately transmitted or blocked by the fixed grating. In other words, the transparent areas of the fixed grating will prevent the light from passing therethrough.

It can be seen that each increment of movement of the movable caliper which results in the cycle of transmission of light to non-transmission of light makes it known that the movable caliper has moved a specific amount. For example, if each transparent area was one ten thousandths of an inch in thickness and each opaque areas one ten thousandths of an inch thickness, it would be known to move from total transmission of light to complete blockage of light requires a movement of one ten thousandths of an inch.

Using a photodiode to produce pulses of electrical current based on this light transmitting versus non-light transmitting quality, an appropriate electrical signal is produced. This electrical signal is processed by appropriate circuitry to cause activation of the electronic calculator. The displayed numerical value of the calculator can be either additively increased a unit or subtractively decreased a unit. It is also considered to be within the scope of this invention that the unit of the calculator could be multiplied or divided or be functionally altered in some other way as taking percentages.

The primary objective of the apparatus of this invention is to design an extremely accurate electronic distance measuring instrument which can be constructed at a manufacturing cost substantially below than was heretofore possible.

A further advantage of this invention is that the use of the conventional handheld calculator is greatly expanded.

Previously, height (or distance) measurements systems have utilized distance actuated devices which operate solely by a mechanical nature thereby inherently not incorporating a high degree of accuracy. The structure of this invention greatly increases the accuracy of such instruments while minimizing the increase in cost.

A further advantage of this invention is that the uses of the handheld calculator are expanded while still permitting the normal use of the calculator.

DETAILED DESCRIPTION OF THE SHOWN EMBODIMENT

Figure 1:
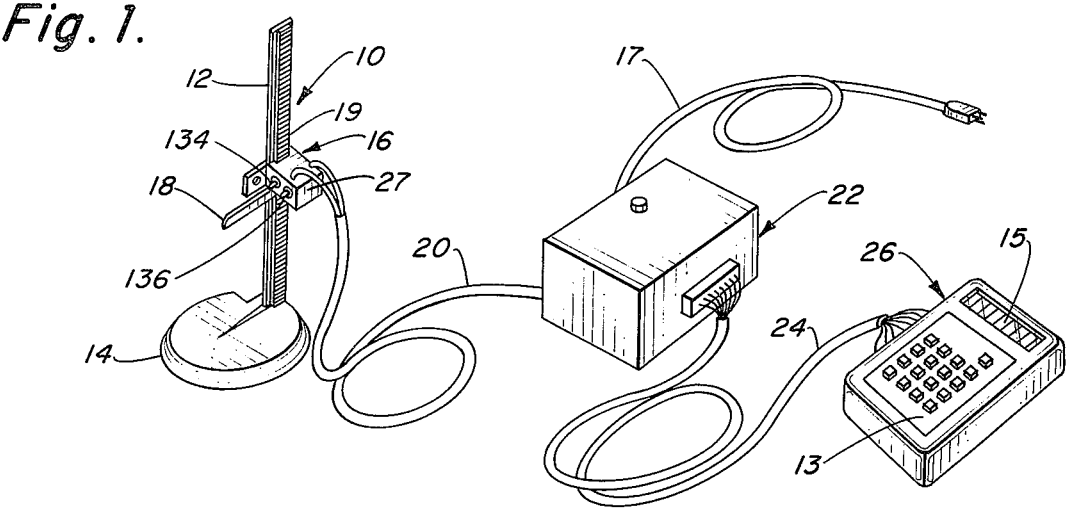
FIG. 1 is an overall isometric view of the structure of this invention showing how such is employed in combination with a caliper distance measuring device and a conventional electronic handheld calculator.

Referring particularly to the drawings, there is shown in FIG. 1, a measurement assembly 10 which is generally constructed of a fixed arm 12 which is fixedly secured to a base 14. The fixed arm 12 includes appropriate guide means on either side thereof which guidingly interconnect with the movable arm 18. Formed upon the fixed arm 12 is a measurement scale such as a scale in inches. The smallest division of this scale will generally be in the range of one hundreth of an inch.

A grating or optical interference device 19 is fixedly mounted upon the arm 12. For purposes of this invention, the grating 19 is composed of a piece of rigid material such as plastic upon which has been fixedly mounted as by adhesive a film 21. The construction of the film 21 will be explained further on in the specification.

Attached to the movable arm 18 is a movable optical interference device 16. Incuded within the movable optical interference device 16 is a film 23, which is identical in construction to the film 21, which is fixedly secured to a plate 25. The plate 25 is fixedly mounted within the housing 27 of the movable optical interference device 16. It is to be noted that the film 23 is to be located directly adjacent or almost in contact with the film 21. The film 21 is shown located parallel to arm 12 but may project at a right angle to the arm 12.

Figure 2:
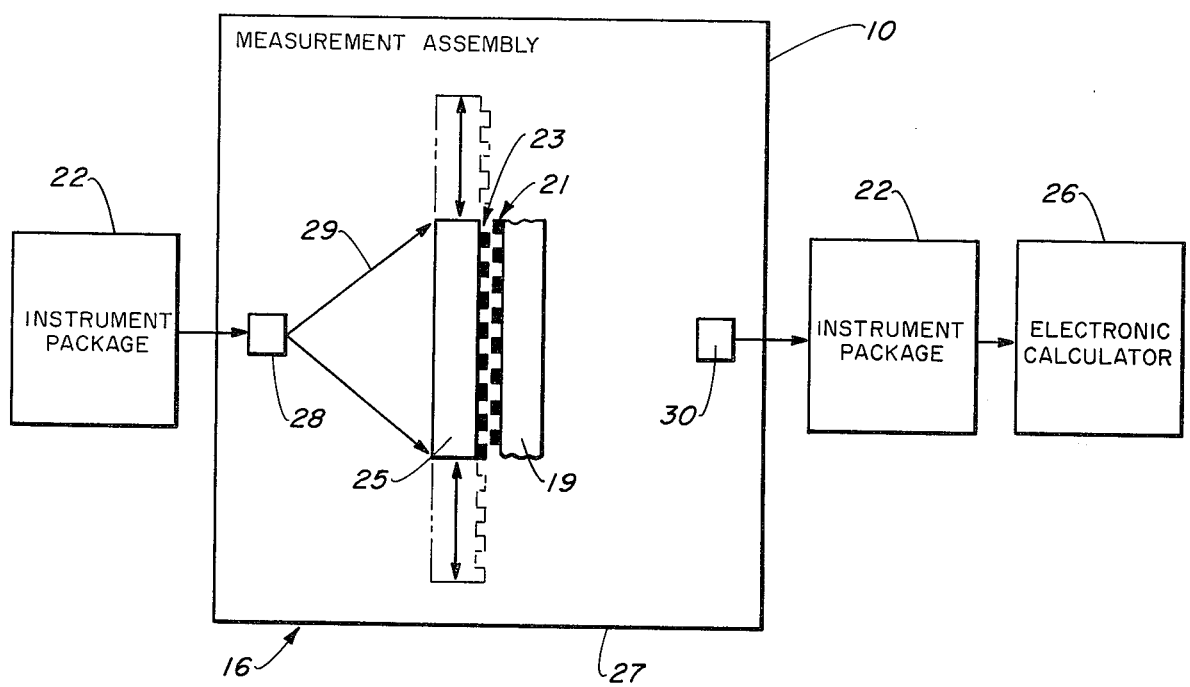
FIG. 2 is a diagrammatic view of the construction of the optical interference devices employed in conjunction with the invention.

Both the films 21 and 23, referring in particular to FIG. 2, shown alternate areas of transparency and opaqueness when taken in cross-section. Each of these films are constructed in precisely this manner to where the lines of opaqueness and lines of transparency are equal in thickness and are essentially in the form of a line. These lines can be any desired thickness, however, the thinner they are, the more precise the calculations can be made with the subject matter of this invention. It is not unusual for each opaque area and each transparent area of each film to be one ten thousandths of an inch in width. Also, it is to be noted that the total length of the film 23 would normally be no more than one half inch to an inch where the film 21 will comprise the total length of the fixed arm 12 of which could be several inches.

Initially, the film 21 is mounted upon the arm 12 so that each measurement interval, such as one inch, is divided into say ten thousand segments (each opaque line being one ten thousandth of an inch and each transpartent line being one ten thousandths of an inch). The film 23 is arranged so that the entire length of film 23 is precisely parallel to the film 21. Also, each opaque line (and also each transparent line) is located precisely in parallel alignment with the similar lines of the film 21. This is important because if this arrangement is not precise, there will be leakage of light therethrough which can disrupt the to be described "on-off" arrangement obtained through the use of the adjacent gratings 21 and 23. It is necessary that such a film be constructed wherein alternate rows, precisely located, of opaque strips and transparent strips can be formed. The resulting pattern of each film 21 and 23 is a fifty percent darkness and a fifty percent brightness pattern when light is falling upon the film and if one were to observe the film on the opposite side thereof.

It is believed to be readily seen that as the film 23 is moved with respect to the film 21 that the light patterns of each will alternately interfere with each other. With the transparent areas aligned, light will be permitted to pass through film 23 and through film 21. However, when the opaque areas of film 21 are in alignment with the transparent areas of the film 23, substantially no light will pass therethrough.

Fixedly mounted within the housing 27 is a light emitting diode 28. Such diodes are well known in the art and are to emit a constant source of light shown generally as arrow pattern 29 in FIG. 2. Diode 28 is to receive electrical power from instrument package 22 to be described further on in the specification. The light from the diode 28 illuminates the plate 25 and a portion thereof is permitted to pass through the transparent areas of the film 23. When the transparent areas of the film 21 align with the film 23, the light, in turn, passes through the film 21, through the device 19 and activates a photodiode 30. It is to be understood that if the opaque areas of the film 21 were aligned with the transparent areas of the film 23, that substantially no light would pass through to the photodiode 30 and this is the relationship which is depicted in FIG. 2. However, it is also to be understood that if the film 23 is just slightly moved, light will pass through film 21 and be picked up by the photodiode 30. The photodiode 30 is also fixedly mounted within the housing 27 and is adapted to only receive light from the backside of the film 21.

Figure 2A:
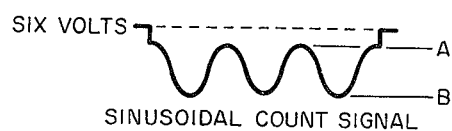
FIG. 2A is a depiction of the waveform produced as the output signal from the measurement assembly assuming a constant rate of movement by the movable interference device.

The resultant light and dark pattern that is received by the photodiode 30 is converted into an electrical output signal. The output signal of the photodiode 30 is shown in FIG. 2A. The sinusoidal pattern of the signal shown in FIG. 2A assumes the film 23 is moved at an even rate with respect to the film 21. If the films 23 and 21 were arranged so that the transparent areas were aligned and light was constantly transmitted therethrough, a constant minimum voltage (B) would be obtained. Conversely, if the opaque areas of film 21 were constantly aligned with film 23, that a constant maximum value (A) of voltage would be obtained. However, by moving the film 23 at a constant rate with respect to film 21, the siusoidal count signal is attained such as shown in FIG. 2A. It is to be noted that the maximum voltage level (A) as shown in FIG. 2A is located below 6 volts which is due to bias leakage in the photodiode 30.

Figure 2B:
FIG. 2B is a depiction of the same waveform produced as the output signal of the instrument package.

The signal from the photodiode 30 is conducted into the instrument package 22, to be described. The output signal of the instrument package 22 is shown in FIG. 2B. The signal has been amplified and changed to assume either a zero level or either a positive value of a plus six volts. It is this type of digital count signal which is required to control the operation of the electronic calculator 26. It is to be noted that the signal voltage (A) with received light at this time assumes a positive 6 volts value wherein signal (B) with no received light now assumes a zero value.

Necessary electrical wires are located within electrical cable 20 which interconnect the instrument package 22 to the movable optical interference device 16. Electrical power is provided from an outside source into the instrument package 22 through cable 17. Cable 24 electrically interconnects the package 22 to the electronic calculator 26.

The electronic calculator 26 is deemed to be a conventional type of instrument. It is manufactured at the current time by several different manufacturers. One such type of instrument that is found to be satisfactory is an instrument which is manufactured by Columbia Scientific, 1730 22nd Street, Santa Monica, California, Columbia Memory III, Model 803M. Basically, the instrument 26 includes a display or digital read out unit 15 which displays the numerical value of the calculation produced by the calculator 26. Normally, the input data is supplied into the calculator 26 through a pushbutton control panel 13. By activation of the pushbuttons on the control panel 13, not only can the instrument be caused to add, subtract, multiply and divide, but may be capable of doing numerous other mathematical functions.

This would mean that as the movable optical interference device 19 is moved a single line of either the space of its transparent area or its opaque area that the decimal value registered on the digital display unit 15 will either increase or decrease by the numerical value of one sixty-fourth of an inch. As the movable optical interference device 17 continues to move, the figure would accumulatively change on the digital display unit 15. In other words, assuming that the movement was from zero to one inch, the change with each increment would be one sixty-fourth of an inch, 2 sixty-fourths of an inch, 3 sixty-fourths of an inch, and so forth until finally obtaining sixty-four sixty-fourths of an inch (which is the unit 1,000,000). Of course these numerals would be represented in decimal form rather than in fractional form on the digital display unit 13.

It is to be understood that if the thickness of each line were one ten-thousandths of an inch, the numeral one divided by ten thousand would be inserted into the memory unit of the electronic calculator 26. In summary, up to this point, it can be seen that a physical measurement is determined through use of the measurement assembly 10 and this physical measurement is precisely recorded on the digital display unit 15 of the calculator 26. Upon movement in an up and down relationship of the arm 18, the value displayed on the digital display unit 15 is correspondingly increased or decreased. The electronics which accomplishes this end is contained within the instrument package 22 which is now to be described in detail.

Figure 3:
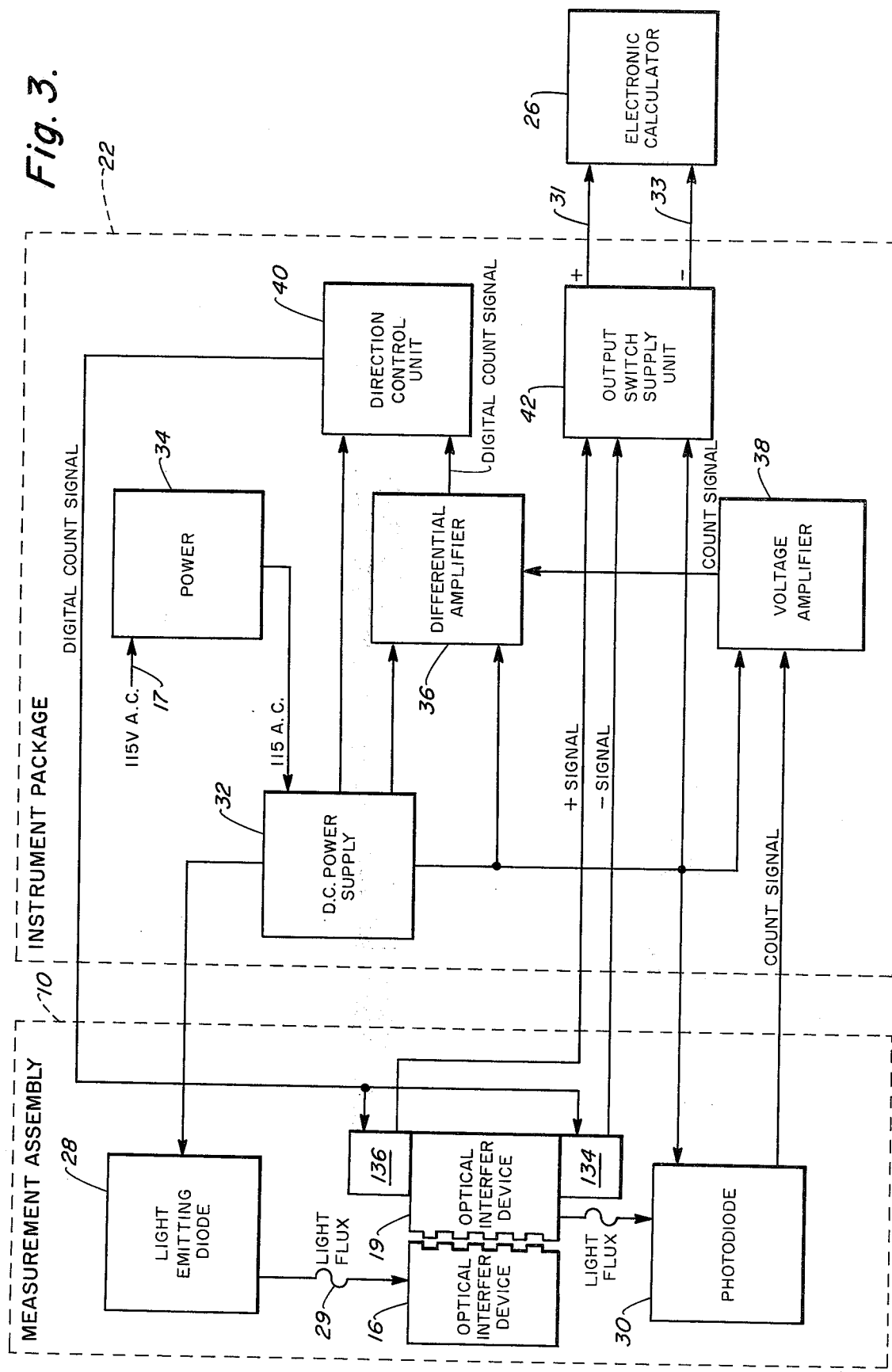
FIG. 3 is an electrical block diagram showing the functional operation of the structure of this invention.

Referring in particular to FIG. 3, the functional operation of the instrument package 22 is in block diagram form as shown. Electrical power from the conduit 17 from the outside source, which will normally be 115 volt alternating current, is supplied to a primary power control unit 34. The power is transmitted from the unit 34 into unit 32 which changes the alternating current into a 6 volt direct current. The six volt direct current is the operating power for the electronic processing circuits contained within the instrument package 22.

The six volt direct current from the power supply 32 is supplied to the light emitting diode 28 located within the measurement assembly 10, to the direction control assembly 40 to be described hereinafter, into the differential amplifier 36 to be described hereinafter, and into the output switching circuit 42 which is to be described hereinafter.

The light emitting diode 28 receives the 6 volts of direct current and produces a constant light flux shown as wavy arrow 29 in FIG. 3. After passing through the optical interference devices 16 and 19, the photodiode 30 uses 6 volts of direct current as a bias voltage and, in turn, converts received light into electrical signals. A voltage amplifier 38 increases the electrical signal level to a value required by differential amplifier 36. It is to be noted that 6 volts of direct current is applied to both the voltage amplifier 38 and photodiode 30.

The differential amplifier 36 produces a digital count signal as shown in FIG. 2A when the amplified count signal from the voltage amplifier 38 exceeds a preset reference voltage. The digital count signal was previously explained. The differential amplifier 36 will be explained in more detail further on in the specification.

The digitized count signal is transmitted to the direction control 40 which determines whether the numerical figure displayed on digital display unit 15 shall be increased or decreased to correspond with the direction of movement of arm 18. When it is desired to move the movable arm 18 in an upward direction, switch 136 is manually activated which causes the numerical figure displayed on the digital display unit 15 to be increased as arm 18 is moved. When it is desired to move the arm 18 in a downward direction, switch 134 is activated to indicate that the movement will be read in a downward direction and therefore the numerical number displayed on the display unit 15 will be decreased as arm 18 is moved. In actual practice, it is envisioned that appropriate electronic switching circuitry will be automatically included and denote the difference between upward and downward movement of the arm 18.

The digitized count signal from the direction control 40 is transmitted to the raise sense switch 136 and the lower sense switch 134. As the arm 18 is moved in an upward direction, the count signal generated by the photodiode 30 is routed into the plus or additive portion of the output switching circuit 42 and as the arm 18 is moved in the downward direction the count signal generated by the photodiode 30 is routed into the minus or subtractive portion of the output switching circuit 42. The output switching circuit 42 controls the additive and subtractive command circuits of electronic calculator 26 through the plus count control line 31 and the negative count control line 33.

Figure 4:
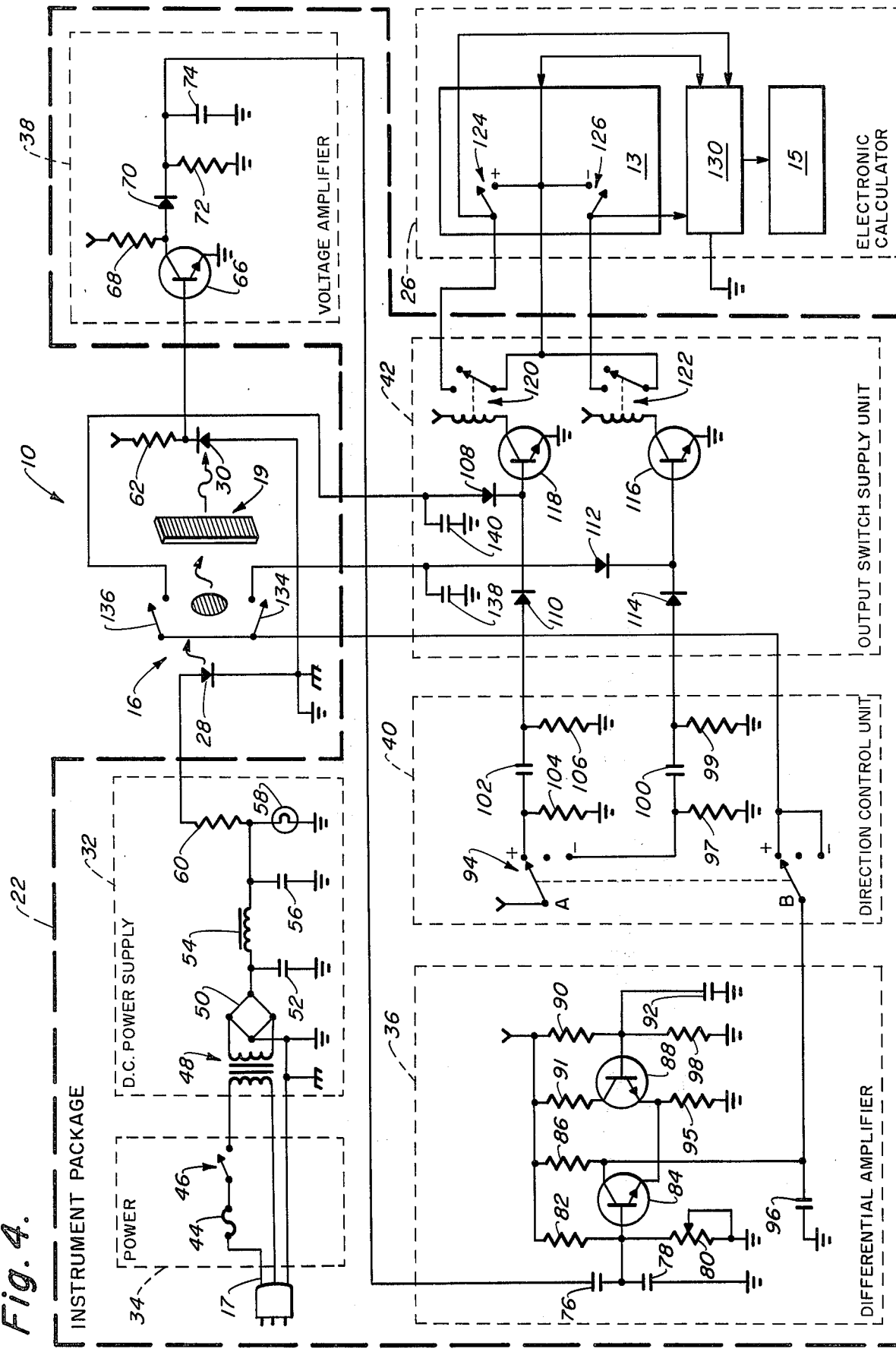
FIG. 4 is an electrical schematic diagram of the structure of this invention.

Referring particularly to FIG. 4, the primary power unit 34 controls application of the 115 volt alternating current from cable 17 by means of the fuse 44 and a power switch 46. Switch 46 is to be manually activated which automatically turns on the instrument package 22. The electrical power is supplied to a step-down transformer 48 which produces 6.3 volts of alternating current. The diode rectifier bridge 50 directs the negative excursions of the alternating current to ground and the positive excursions to inductor 54 and capacitor 52. The output voltage from diode rectifier bridge 50 is 8 ½ volts direct current. The combination of inductor 54, capacitor 52 and capacitor 56 removes fluctuations in the direct durrent and delivers to pilot lamp 58 a voltage of 6 volts direct current. This voltage is applied at the electronic circuits requiring a 6 volt direct current and these circuits were previously mentioned.

Power supply 32 also supplies through resistor 60 a direct current of 800 milliamperes at a voltage of 2 volts to light emitting diode 28. The light emitting diode 28 produces a constant light flux, which illuminates the movable optical interference device 16. This flux interacts with fixed optical interference device 19 in a manner as previously described. The resultant light pattern is picked up by the photodiode 64 and with bias voltage from the resistor 62 produces an electrical signal. This signal is in the order of millivolts and is amplified in voltage amplifier 38 which consists of field effect transistor 66 and resistor 68.

Resistor 68 is a drain load and develops a signal in the order of several tenths of a volt. Diode 70 isolates the voltage amplifier 38 from any possible switching transients occurring in differential amplifier 36. Resistor 72 is a load for diode 70. Capacitor 74 reduces noise fluctuations in the signal.

Differential amplifier 36 receives a signal through capacitor 76. Capacitor 78 stabilizies the voltage on the base of transistor 84. Resistor 82 supplies bias voltage to the base of transistor 84 and resistor 86 is a load resistor for the collector of transistor 84. Capacitor 96 stabilizes the voltage on the collector of transistor 84. Potentiometer 80 controls the base voltage and thereby the switching sensitivity of the transistor 84. The emitters of transistors 84 and 88 are connected to resistor 94 thereby setting these emitters at equal potentials.

Resistor 90 and resistor 98 provide a bias voltage for the base of transistor 88. This voltage is held constant by capacitor 92. Resistor 91 is a load resistor for transistor 88.

The operation of this differential amplifier consists of transistor 84, switching from a plus 6 volt direct current level to a zero volt direct current level whenever the signal voltage at the base of transistor 84 exceeds the bias voltage at the base of transistor 88. The output of transistor 84 follows the count signal from voltage amplifier 38 but switches from near plus 6 volts direct current to zero, as shown in FIG. 2B.

The output signal from differential amplifier 36 is routed through section "B" of the triple pole, double throw switch 94, when in the plus or minus direction, to raise sense switch 136 and lower sense switch 134. When raise sense switch 136 is closed the digital count signal is routed to transistor 118 through diode 108. When lower sense switch 134 is closed the digital count signal is routed to transistor 116 through diode 112.

The common pole of section "A" of the triple pole, double throw switch 94 is connected to the 6 volt direct current line. The plus pole of section "A" is connected to a differentiation network consisting of resistor 104, resistor 106 and capacitor 102. The minus pole of section "A" is connected to a differentiation network consisting of resistor 96, resistor 98 and capacitor 100. The operation of these two differentiation networks are the same, therefore the operation of only the plus differentiation network will be described. As the triple pole, double throw switch 94 is placed in the plus position, the 6 volt direct current is routed to the plus differentiation network (resistor 104, resistor 106 and capacitor 102). The rising voltage at capacitor 102 is instantly transferred across to resistor 106. But since there is not direct connection across capacitor 102, the voltage on resistor 106 decays at about 100 milliseconds. The pulse generated by this method is routed through steering diode 110 and into the base of transistor 118. Transistor 118 switches on for a period of time corresponding to the pulse generated in the differentiation network. During the time transistor 118 is switched on, the single pole, single throw relay 120 is actuated and its contacts are closed. This completes a circuit path in electronic calculator 126 and generates one (in number) plus command signal. After the voltage on transistor 106 decays to a voltage insufficient to hold transistor 118 in the "on" state, single pole, single throw relay 120 de-energizes and the contacts open and the circuit path in electronic calculator 26 is broken. Electronic calculator 26 is now in the plus count mode.

Operation of the minus pole of section "A" and its associated differentiation network consisting of resistor 96, resistor 98 and capacitor 100, steering diode 114, transistor 116 and single pole, single throw relay 122 is similar to the aforementioned plus count circuitry except that one minus command signal will be generated and sent to electronic calculator 26.

The operation of section "B" of triple pole, triple throw switch 94, knowing that section "A" and section "B" are mechanically linked and that they will switch simultaneously, consists of routing digital count signals to the common terminals of raise sense switch 136 and lower sense switch 134.

When raise sense switch 136 is close, the digitized count signal is routed through diode 108 to the base of transistor 118. Capacitor 140 reduces contact bounce noise from raise sense switch 136. The digital signal causes transistor 118 to turn "on" during positive pulses causing single pole, single throw relay 120 contacts to close.

When lower sense switch is closed, the digital count signal is routed through diode 112 to the base of transistor 116. Capacitor 138 reduces contact bounce noise from lower sense switch 134. The digital count signal causes transistor 116 to turn "on" during positive pulses causing single pole, single throw relay 122 contacts to close. The contacts of single pole, single throw relays 120 and 122 are connected in parallel with the plus selection switch and the minus selection switch, respectively, of pushbutton control panel 128. This method of inputting commands and count signals provides an independence of operation between the instrument package 22 and the electronic calculator 26.

The computer unit 130 sends a digitized signal to the common connection point of the plus selection switch 124 and the minus selection switch 126, both of which are located on the pushbutton control panel 13. When either of these switches are pressed or paralleled by relay circuits in the instrument package 22, an appropriate data entry into the computer 130 is made. The data is processed in the computer 130 and the accumulative results are displayed on the display unit 15.

The following values for the different electronic parts shown in the diagram of FIG. 4 have been found to be satisfactory, but it is not at all mandatory that these said values be adhered to. Capacitor 52, 0.002 Farads; capacitor 56, 0.003 Farads; resistor 60, 10 Ohms; resistor 62, 1.0 Megohms; resistor 68, 1,000 Ohms; resistor 72, 27 Kilo-ohms; capacitor 74, 10 Microfarads; capacitor 76, 10 Microfarads; capacitor 78, 1 Microfarad; resistor 82, 56 Kilo-ohms; potentiometer 80, 10 Kilo-ohms; resistor 86, 10 Kilo-ohms; resistor 94, 100 Ohms; capacitor 96, 10 Microfarads; resistor 90, 10 Kilo-ohms; transistors 84 and 88 are of the same type resistor 90, 56 Kilo-ohms; capacitor 92, 47 Microfarads; resistors 96 and 98 both 100 Kilo-Ohms; capacitor 100, 5.6 Microfarads; resistor 104, 100 Kilo-ohms; capacitor 102, 5.6 Microfarads; resistor 106, 100 Kilo-ohms; transistors 116 and 118 both the same type capacitors 130 and 140 both 0.01 Microfarads.

The operation of the device of this invention is as follows: It will be assumed that the movable arm 18 is placed in contact with the base 14 so that a zero reference position is established. The cable 17 is connected to a source of electrical power which is conducted to instrument package 22 once switch 46 has been placed in the "on" position. Electrical power is to then be supplied to the electronic calculator 26 which normally contains an internal power unit which is composed of at least one battery. The switch 94 is set in the neutral position, placing both section "A" and section "B" of switch 94 in that position.

The electronic calculator is pre-set according to the spacing of the lines on the optical interference device 16 and 19. This is accomplished in the manner as previously described wherein the number 1.0 is entered in the calculator, the divide key is then pressed and the number 64 is entered, the equals key is then pressed displaying the number 0.015625 on the digital display unit 15. This is the count base for the measurement device 10. This count base is to be placed within the memory unit of the calculator 26 and the digital display unit 15 itself is reset at zero.

The switch 94 is then moved to the plus position for both sections "A" and "B". The movable arm 18 is then grasped and slowly moved in the up position. After passage of each line on the fixed film 21 the value of 0.015625 is added to the number on the display unit 15 and continues to accumulate for each line of the film 21 that is passed. When the movable arm 18 is raised a sufficient distance in order to insert the item that it is desirous of obtaining a measurement between the arm 18 and the base 14, the item is then inserted and the arm 18 is to be brought in the downward direction and contact with the item. Prior to moving the arm in a downward direction, the switch 94 is moved to the minus position which means that with each movement past a line on the film 21 the value of 0.015625 will be subtracted from the numerical figure displayed on the display unit 15. Once the arm 18 has come into contact with the item placed on base 14, and the arm 18 can move no further, the numerical figure displayed on the display unit 15 can be read giving the particular dimension of the item in inches.

The procedure is repeated for other measurements of the same item or measurements of other items.

What is claimed is:

1. In combination with an electrical hand calculator, said calculator having a computer unit adapted to make mathematical calculations such as add, subtract, multiply and divide, said calculator including a digital display unit capable of displaying in digit form a numerical value determined by said computer unit, said calculator having a normally operable control panel employable to supply input into said computer unit to make said mathematical calculations, said control panel connected to an additive selection switch and a subtractive selection switch, upon actuation of said additive selection switch a predetermined numerical value is automatically added to the number displayed by said display unit with the then total accumulative value being displayed, upon actuation of said subtractive selection switch a predetermined numerical value is automatically subtracted to the number displayed by said display unit with the then total accumulative value being displayed, the improvement comprising:
    an optical counting apparatus located exteriorly of said electronic calculator and being electrically connected to both said additive and said subtractive selection switches, said counting apparatus capable of actuating said additive and said subtractive selection switches as though the actuation was performed by said control panel;
    a first interference device;
    a second interference device, said second interference device being movable with respect to said first interference device, both said first and said second interference devices having opaque areas and transparent areas, as said second interference device is moved said transparent areas are alignable permitting passage of light therethrough and also said opaque areas are alignable blocking the passage of light;
    a light producing means located adjacent said second interference device capable of projecting light through said transparent areas of said second interference device which subsequently is capable of being transmitted through said transparent area of said first interference device;
    light sensitive means located adjacent said first interference device, said light sensitive means being activated during the cycle of receiving no light to receiving light, upon activation of said light sensitive means an electrical signal is transmitted to a control means which thereupon causes activation of said electronic calculator;
    the size of the transparent areas on said first interference device being equal to the size of said opaque areas on said first interference device, the size of said transparent areas on said second interference device being equal in size to the size of said opaque areas on said second interference device, both said first interference device and said second interference device comprising a thin sheet of film; and
    the size of said transparent areas and said opaque areas on both said interference devices being equal in size.

2. The combination as defined in claim 1 wherein: each of said opaque areas in each of said transparent areas comprising a narrow elongated strip.

3. The combination as defined in claim 2 wherein: said film strip of said first interference device being located in a parallel relationship with respect to said film strip of said second interference device, each said elongated strip on said first interference device being parallel with respect to each other, each said elongated strip on said second interference device being parallel with respect to each other, each said elongated strip on said first interference device being parallel to each said elongated strip upon said second interference device.

4. The combination as defined in claim 3 wherein: said first interference device being mounted upon a fixed member of a measuring instrument adapted to determine measurements of physical objects, said second interference device being mounted upon a movable member of said measuring instrument with said movable member being movably mounted with respect to said fixed member, whereby said movable member may be moved in relation to said fixed member until the precise measurement of a physical object is determined at which time the measurement can be observed in digital form on said display unit of said calculator.

* * * * *